US005109727A

United States Patent [19]

Joyce

[11] Patent Number: 5,109,727

[45] Date of Patent: May 5, 1992

[54] ROTARY ADJUSTMENT CAM

[75] Inventor: Ronald S. Joyce, Elk Grove Village, Ill.

[73] Assignee: Eaton Corporation, Cleveland, Ohio

[21] Appl. No.: 661,952

[22] Filed: Feb. 28, 1991

[51] Int. Cl.[5] ...................... F16H 53/08; H01H 19/00

[52] U.S. Cl. .................................... 74/568 R; 74/553; 200/11 G; 200/6 R; 464/900; 464/98

[58] Field of Search ..... 74/126, 128, 553, 573 R–574, 74/572, 568 R; 200/6 R, 35 R, 11 G; 464/900, 98, 180

[56] References Cited

U.S. PATENT DOCUMENTS

| | | | |
|---|---|---|---|
| 1,645,510 | 10/1927 | Wood | 464/98 |
| 2,281,468 | 4/1942 | Lammeren | 74/568 |
| 2,407,757 | 9/1946 | MacCallum | 464/98 |
| 2,484,667 | 12/1953 | Arisman et al. | 464/900 |
| 3,256,713 | 6/1966 | Luefling et al. | 464/900 |
| 3,985,043 | 10/1976 | Toratani | 74/572 |
| 4,012,806 | 3/1977 | Howie, Jr. | 74/553 |
| 4,044,628 | 8/1977 | Jacks | 74/574 |
| 4,626,637 | 12/1986 | Olsson et al. | 200/11 G |
| 4,711,610 | 12/1987 | Riehl | 74/573 R |
| 4,724,286 | 2/1988 | Cummins | 200/6 R |

FOREIGN PATENT DOCUMENTS

| | | | |
|---|---|---|---|
| 0398074 | 5/1909 | France | 464/98 |
| 0027976 | 5/1981 | United Kingdom | 200/6 R |

*Primary Examiner*—Rodney H. Bonck
*Assistant Examiner*—Winnie Yip
*Attorney, Agent, or Firm*—R. A. Johnston

[57] ABSTRACT

A rotary adjustment device adapted for user rotation to adjust the position of an adjacent mechanism such as the linkage for actuating an electrical snap switch. The device has an outer annular cam with a central hub structure with a shaft defining surface adapted for being rotatably journalled. The hub is suspended from the cam by torsionally stiff web structure which is radially inner an outer pairs of oppositely disposed spokes which permit resilient deflection, when unwanted side loads are applied to the shaft for preventing disturbances of the cam once the user has selected a rotary position.

3 Claims, 2 Drawing Sheets

ROTARY ADJUSTMENT CAM

BACKGROUND OF THE INVENTION

The present invention relates to a rotary device for adjusting the position of a mechanism which requires a substantial degree of precision in calibration. The rotary adjustment device of the present invention is particularly applicable to the adjustment of a pivoted lever employed in the mechanism for actuating an electric switch; as, for example, the mechanism employed in a pressure switch of the type having a pressure sensing diaphragm movable to actuate a snap-acting electrical switch. In pressure switches of this latter type, typically employed for sensing the water level in a household washing machine, the diaphragm is preloaded by a suitable force-applying device. such as a compression spring which, in turn, has the length thereof adjustable by a lever mechanism for changing the preload of the spring on the diaphragm and thus the actuation point of the switch as desired for actuation at different preselected water levels. Switches of this type are typically employed to shut off the electrically operated water fill valve of the washing machine when the water level in the machine tub reaches the desired level.

Typically, in a household washing machine, the pressure switch employed for shutting off the electrically operated water fill valve or the washing machine tub has a control knob or lever extending from the machine control panel, enabling the machine operator to select the setting of the pressure switch for controlling the level of the water fill in the machine tub. The operator controlled knob or lever is typically directly connected to the internal lever mechanism of the pressure switch for changing the actuation point of the electrical switch therein. Appliance water level pressure switch applications of this sort typically employ a snap-acting switch which has a high degree of sensitivity to changes in the switch actuation point by an adjustment mechanism. Movement by an amount of only a very small fraction of an inch on the order of 1/32of an inch (0.8 mm) can result in a substantial change in the setting of the switch actuation point. Thus, inadvertent movement or undesired pressure on the selector lever or control knob after a selection of water level has been made can result in alteration of the setting of the pressure switch and an undesirable level of water flow. This problem has been particularly troublesome where the adjustment mechanism employed utilizes a rotary cam for adjusting the position of a lever mechanism such as is used in an appliance pressure switch.

It has thus been desired to find a way or means of desensitizing an adjustable pressure switch from inadvertent and undesired mechanical loading of the user movable control once the desired setting has been chosen. In particular, it has been desired to desensitize a pressure switch having a rotatable adjustment cam for selecting among various desired settings of the switch actuation point by changing the position of the adjustment cam with respect to the internal actuation mechanism for the switch.

SUMMARY OF THE INVENTION

The present invention provides a unique and novel rotary adjustment mechanism suitable for use in adjusting the position of a desired actuating mechanism by the user changing the rotary position of the adjustment device. The device of the present invention has particular application for changing the setting of the electrical switch actuation mechanism employed in a relatively low pressure sensing pressure switch employed for sensing water level in a household appliance. The rotary adjustment device of the present invention employs an outer annular portion defining thereon a cam and has a radially inwardly extending supporting web from which depends a central hub structure, which defines surfaces adapted for rotatably journalling the device.

The web structure defines regions thereof especially configured which can absorb, by resilient deflection thereof, side loading of the hub, thereby leaving the outer annular portion substantially undisturbed.

The web supporting the hub from the outer annular portion has slots formed therein in the preferred practice, and which are arranged in pairs and oriented in quadrature. The slots are disposed with a first pair forming therebetween a first pair of diametrally oppositely disposed radial spokes. The second plurality of slots is disposed radially outwardly of the first pair and is arranged in circumferentially spaced arrangement to form therebetween a second pair of diametrally oppositely disposed radially extending spokes. The first and second pair of radially extending spokes are arranged at right angles, or to divide the web portion in quadrants. The spokes thus suspend the hub so that the hub may be resiliently deflected about perpendicular axes which are perpendicular to the hub axis in a direction and sense so as to apply torsional loads to the spokes. The web has however, sufficient torsional stiffness about the axis of the hub to applied torque transmit applied torque from the hub to the annular portion with the cam.

The present invention thus provides a rotary adjustment device having an outer annular cam for effecting desired adjustment of an essential mechanism. The cam is connected suspended to a hub structure defining surfaces adapted for journalling the hub for rotation in a mounting structure. The annular cam is suspended from the hub structure by a web structure having especially configured resilient portions which preferably comprise two pairs of oppositely disposed radial spokes, with the pairs disposed at right angles and interconnected by radially intermediate structure. Deflection of the hub about mutually orthogonal axes is absorbed by torsional deflection of the spokes, yet torsional stiffness of the web is maintained for transmitting rotary displacement of the hub about its axis to the annular cam.

DETAILED DESCRIPTION

Figure 2:
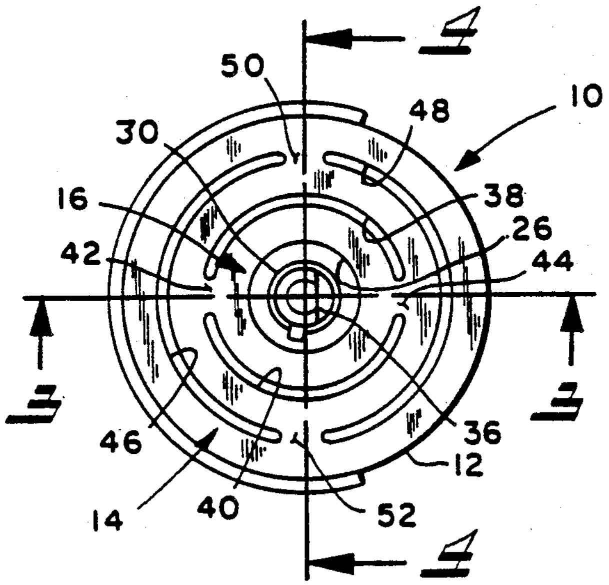
FIG. 2 is an end view of the rotary adjustment device of the present invention taken from the left in FIG. 1.
Figure 1:
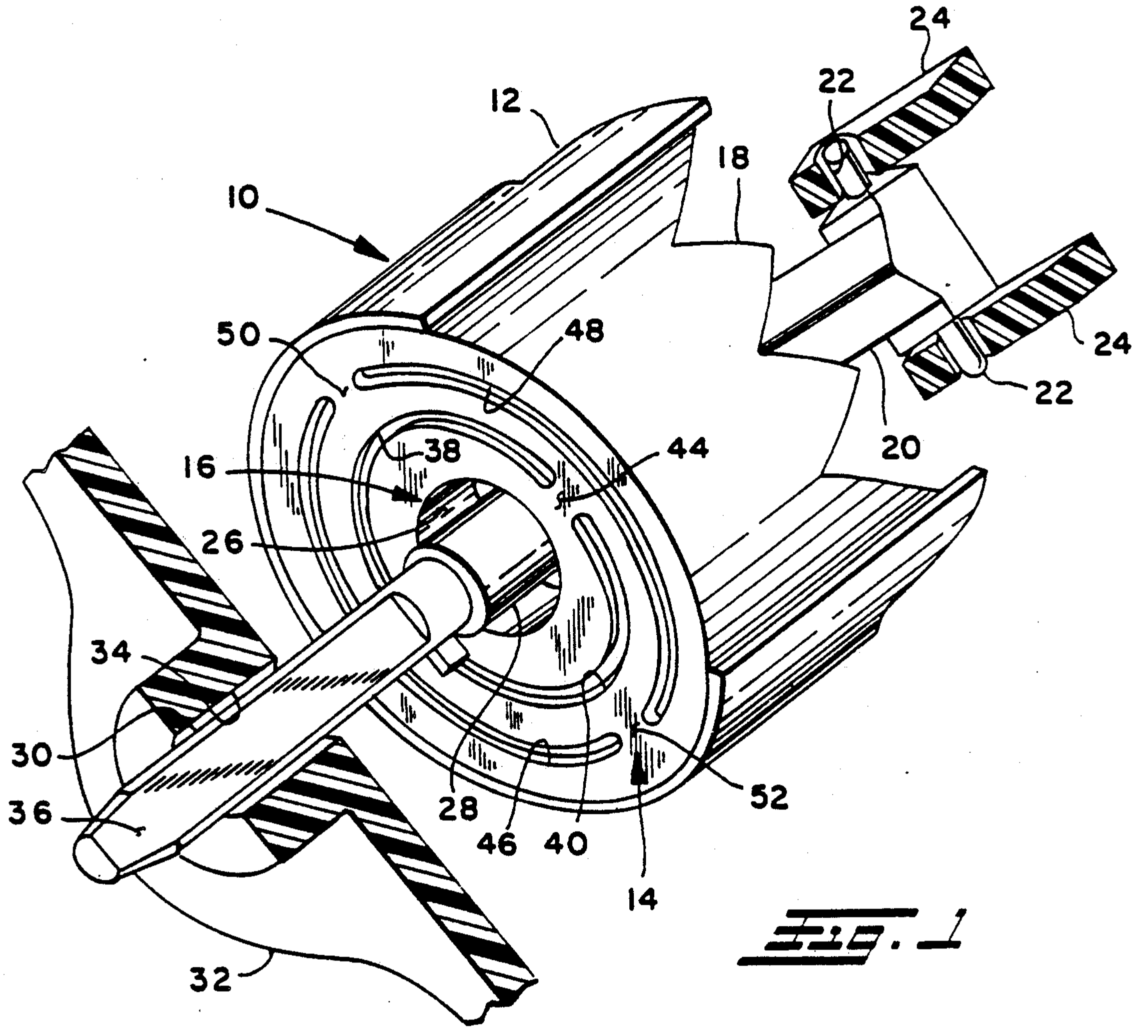
FIG. 1 is a somewhat axonometric projection of the rotary adjustment device of the present invention.

Referring to the drawings, the rotary adjustment device of the present invention is indicated generally at 10, and has an outer generally cylindrical tubular wall 12 with an inwardly extending web structure indicated generally at 14, and has centrally disposed hub structure indicated generally at 16 depending from the web structure 14.

The annular wall 12 has a cam surface 18 formed thereon which is adapted for contacting an adjustment mechanism such as cam follower lever 20 pivoted by pins 22, which are journalled on any convenient support structure, such as the stanchions 24. The cam follower lines 20 may be any adjustment mechanism as, for example, the adjustment lever for a relatively low pressure sensing pressure switch.

The hub structure 16 includes the cup-shaped central portion 26 with shaft 28 extending outwardly therefrom with cylindrical journalling surface 30 adapted for being journalled in a suitable mounting structure such as the bearing plate 32, which has a bearing surface 34 provided thereon. The shaft 28 may be provided with a flattened surface 36 for driving engagement therewith by a suitable knob or lever (not shown).

The web structure 14 which supports the hub structure 16 within the outer wall 12, or conversely supports the outer annular wall 12 about the hub structure 16 is especially configured to permit resilient deflection of the hub under side loads; and, in the presently preferred practice, has a first pair of arcuate slots 38, 40 formed therein and diametrally oppositely disposed. The ends of the slots 38, 40 defining therebetween a pair of diametrally oppositely disposed spokes 42, 44 from which the hub structure is suspended along a horizontal axis in FIG. 2. The spokes 42, 44 are resiliently deflectable in torsion about a horizontal axis in FIG. 2, but maintain torsional stiffness of the web structure 14 about the axis of shaft 28.

A second pair of oppositely disposed arcuate slots 46, 48 are disposed concentrically with and radially outwardly spaced from the inner slots 38, 40. The outer pair of slots 46, 48 have the ends thereof terminating in spaced relationship to form a pair of diametrally oppositely disposed radial spokes 50, 52 which suspend the portion of the web structure radially inwardly of the slots 46, 48 from the outer peripheral portion of the web structure 14 which is attached to the outer wall 12. The spokes 50, 52 are resiliently deflectable in torsion about a vertical axis in FIG. 2, but maintain torsional stiffness of the web structure 14 about the axis of shaft 28.

Although the especially configured resilient portions of the web structure have been illustrated herein as arcuate slots and spokes, it will be understood that other configurations may be employed; as, for example, threading the web in selected regions as opposed to apertures or slots, or convoluting or corrugating the web structure.

Figure 3:
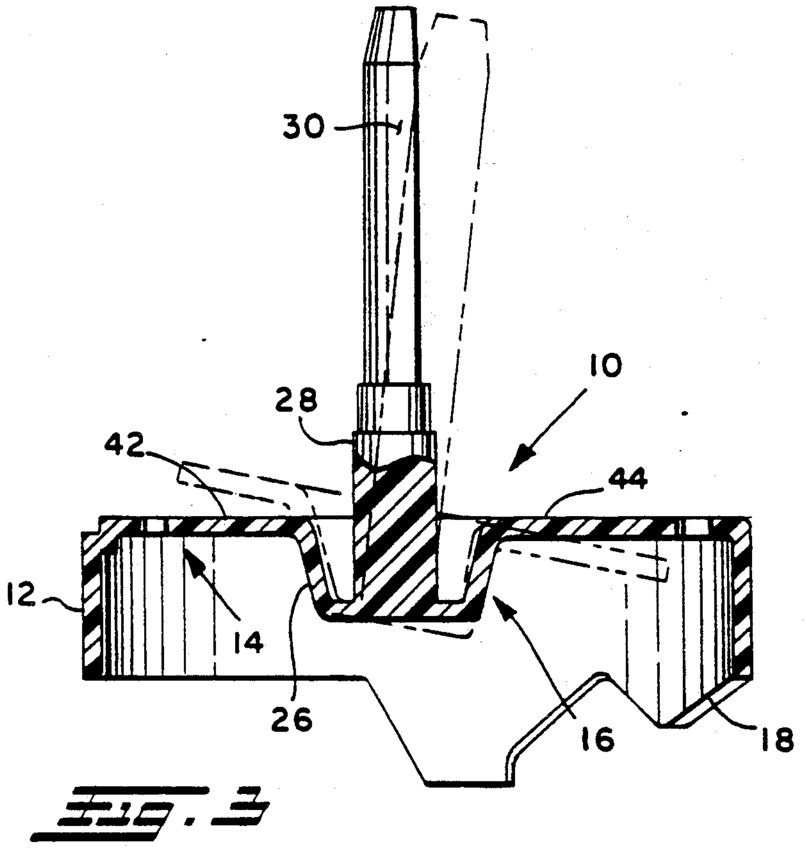
FIG. 3 is a section-view taken along section-indicating lines 3—3 of FIG. 2.

Referring to FIGS. 2 and 3, if an assumed side load is applied to the shaft 28 in the horizontal direction in FIG. 2, the resultant deflection is of the hub structure 16 radially inwardly of slots 46, 48 about a vertical axis by torsional deflection of the spokes 50, 52, and is shown in dashed outline in FIG. 3.

Figure 4:
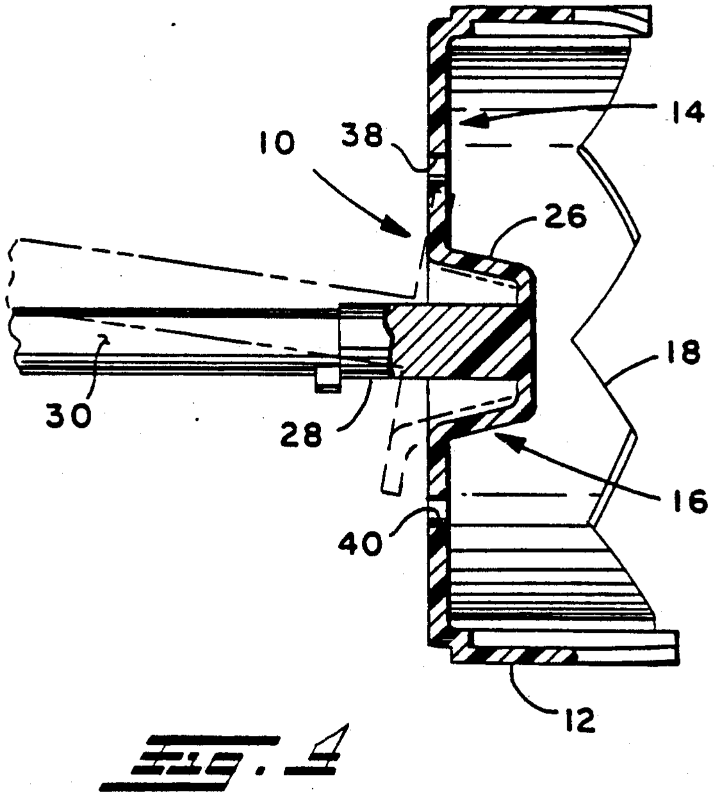
FIG. 4 is a section-view taken along section-indicating lines 4—4 of FIG. 2.

An assumed side load applied to the shaft 28 in the vertical direction in FIG. 2 causes resilient deflection of the radial spokes 42, 44 about a horizontal axis, and results in movement of the hub structure 16 portion of the hub structure radially inwardly of slots 38, 40 and is shown in dashed outline in FIG. 4. Thus, the shaft 28 may be moved with two independent degrees of freedom about mutually orthogonal axes lying in the plane of the web structure 14. Although the web structure 14 is resiliently deformable by virtue of the spokes 38, 40, and 46, 48, the web structure is quite stiff torsionally when subjected to torques about the axis of the shaft 28. Thus the web structure is capable of transmitting torsional movement of the shaft 28, imparted by the user, to the outer cylindrical wall 12 for moving the cam surface 18.

The present invention thus provides a unique and novel adjustment device having a rotary cam surface for contacting an associated mechanism to be adjusted. The device permits user rotation of an input shaft and hub structure which moves an annular outer cam surface, yet is capable of absorbing side loads to the shaft by resilient deflection of the intermediate web structure of the device without disturbing the position of the outer annular cam. The device is formed integrally in one piece, preferably of plastic material.

Although the invention has hereinabove been described with respect to the embodiments illustrated in the drawings, it will be understood by those having ordinary skill in the art that the invention is capable of modification and variation, and is limited only by the scope of the following claims.

I claim:

1. A rotary adjustment cam means comprising:

(a) an outer wall having a generally cylindrical shape with cam surfaces disposed generally peripherally thereabout and adapted for contacting a cam follower;

(b) torque web means extending radially inwardly from said outer wall;

(c) a centrally disposed hub defining journal surfaces thereon and extending axially from said web means, said outer wall, web means, and hub formed integrally as a one piece member, said web means operable to transmit torque from said hub to said outer wall about the axis of said hub; and, (d) said web means including a first pair of oppositely disposed circumferentially spaced arcuately shaped slots formed therein, said slots forming in the region circumferentially therebetween a first pair of oppositely disposed radial spokes torsionally resilient about a first radial axis, said first pair of spokes connected to an annular intermediate region radially outwardly of said first pair of slots, said web means further including a second pair of oppositely disposed circumferentially disposed arcuate slots disposed outwardly of said annular region and defining in the circumferential regions therebetween a second pair of outwardly extending radial spokes connecting said annular intermediate region with said outer wall, said second pair of spokes torsionally resilient about a second radial axis in quadrature with said first radial axis, said first and second pairs of spokes operative to permit lateral deflection of said hub with respect to said wall yet transmit driving torque therebetween.

2. The adjustment cam means defined in claim 1, wherein said hub includes a shaft portion formed integrally therewith and extending axially therefrom.

3. The adjustment cam means defined in claim 1, wherein said one-piece member is formed of plastic material.

* * * * *